United States Patent
Chhabra et al.

(10) Patent No.: US 7,821,941 B2
(45) Date of Patent: Oct. 26, 2010

(54) AUTOMATICALLY CONTROLLING OPERATION OF A BRAS DEVICE BASED ON ENCAPSULATION INFORMATION

(75) Inventors: Avneet Singh Chhabra, Near Geetanjali Layout (IN); Anshul Tanwar, Adugodi (IN); Anand Agarwal, Kundalahalli (IN); Krishna Sundaresan, Indiranagar (IN); Ralph Droms, Westford, MA (US); Indrajanti Sukiman, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 771 days.

(21) Appl. No.: 11/592,457

(22) Filed: Nov. 3, 2006

(65) Prior Publication Data
US 2008/0109559 A1 May 8, 2008

(51) Int. Cl.
*G01R 31/08* (2006.01)
*G06F 11/00* (2006.01)
*G06F 15/173* (2006.01)
*G06F 15/16* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. .................. 370/235; 709/225; 709/229
(58) Field of Classification Search .................. 370/230, 370/239, 466, 352, 401, 230.1, 231, 235; 709/245, 238, 225, 229; 726/21
See application file for complete search history.

(56) References Cited

U.S. PATENT DOCUMENTS

| | | | |
|---|---|---|---|
| 5,922,049 A | 7/1999 | Radia et al. | |
| 5,987,011 A | 11/1999 | Toh | |
| 6,289,377 B1 | 9/2001 | Lalwaney et al. | |
| 6,542,491 B1 | 4/2003 | Tari et al. | |
| 6,633,563 B1 | 10/2003 | Lin et al. | |

(Continued)

FOREIGN PATENT DOCUMENTS

EP     1 494 391 A1     1/2005

(Continued)

OTHER PUBLICATIONS

Technical Report, DSL Forum TR-01: "Migration to Ethernet-Based DSL Aggregation", XP-002411174, Apr. 2006.*

(Continued)

*Primary Examiner*—Ayaz R Sheikh
*Assistant Examiner*—Hoang-Chuong Q Vu
(74) *Attorney, Agent, or Firm*—BainwoodHuang (57) ABSTRACT

A technique controls operation of a BRAS device. The technique involves extracting encapsulation information from a communications exchange between a CPE device and an external server device (e.g., a DHCP server). The communications exchange passes through the BRAS device and a DSLAM device. The technique further involves storing the encapsulation information in local memory of the BRAS device, and controlling a flow of a downstream communication passing through the BRAS device and the DSLAM device toward the CPE device based on the encapsulation information stored in the local memory of the BRAS device. Accordingly, the BRAS device is well suited for performing ATM overhead accounting as well as shaping and policing downstream traffic.

22 Claims, 6 Drawing Sheets

U.S. PATENT DOCUMENTS

| | | | |
|---|---|---|---|
| 6,640,278 | B1 | 10/2003 | Nolan et al. |
| 6,748,439 | B1 | 6/2004 | Monachello et al. |
| 6,751,218 | B1 | 6/2004 | Hagirahim et al. |
| 6,751,670 | B1 | 6/2004 | Patterson |
| 6,876,667 | B1* | 4/2005 | Synnestvedt et al. ........ 370/466 |
| 6,903,755 | B1 | 6/2005 | Pugaczewski et al. |
| 6,957,276 | B1 | 10/2005 | Bahl |
| 6,993,048 | B1 | 1/2006 | Ah Sue |
| 7,039,035 | B2 | 5/2006 | Droms et al. |
| 7,051,089 | B1 | 5/2006 | Johnson et al. |
| 7,131,141 | B1 | 10/2006 | Blewett et al. |
| 7,139,818 | B1 | 11/2006 | Kinnear, Jr. et al. |
| 7,143,435 | B1* | 11/2006 | Droms et al. .................. 726/3 |
| 7,152,117 | B1 | 12/2006 | Stapp |
| 7,167,920 | B2 | 1/2007 | Traversat et al. |
| 7,254,134 | B2 | 8/2007 | Lin et al. |
| 2001/0043616 | A1 | 11/2001 | Hild et al. |
| 2002/0059429 | A1 | 5/2002 | Carpenter et al. |
| 2002/0162029 | A1 | 10/2002 | Allen et al. |
| 2003/0005112 | A1 | 1/2003 | Krautkremer |
| 2003/0058874 | A1 | 3/2003 | Sahaya et al. |
| 2003/0120818 | A1 | 6/2003 | Ho |
| 2003/0165121 | A1 | 9/2003 | Leung et al. |
| 2004/0022258 | A1 | 2/2004 | Tsukada et al. |
| 2004/0073600 | A1* | 4/2004 | Elo et al. .................... 709/201 |
| 2004/0105444 | A1* | 6/2004 | Korotin et al. ........... 370/395.5 |
| 2004/0113908 | A1 | 6/2004 | Galanes et al. |
| 2004/0136394 | A1* | 7/2004 | Onno et al. .................. 370/438 |
| 2004/0165592 | A1 | 8/2004 | Chen et al. |
| 2004/0213234 | A1 | 10/2004 | Koch et al. |
| 2004/0229627 | A1 | 11/2004 | Malladi et al. |
| 2005/0044265 | A1* | 2/2005 | Vinel et al. ................. 709/238 |
| 2005/0220099 | A1 | 10/2005 | Igarashi |
| 2005/0232228 | A1* | 10/2005 | Dharanikota et al. ........ 370/351 |
| 2005/0252957 | A1 | 11/2005 | Howarth et al. |
| 2005/0252970 | A1 | 11/2005 | Howarth et al. |
| 2005/0253717 | A1 | 11/2005 | Howarth et al. |
| 2005/0253718 | A1 | 11/2005 | Droms et al. |
| 2005/0253722 | A1 | 11/2005 | Droms et al. |
| 2005/0264420 | A1 | 12/2005 | Vogel et al. |
| 2005/0271049 | A1 | 12/2005 | Jain et al. |
| 2006/0028982 | A1* | 2/2006 | Wright ....................... 370/230 |
| 2006/0239273 | A1 | 10/2006 | Buckman et al. |
| 2007/0081523 | A1 | 4/2007 | Mishra |
| 2007/0180120 | A1 | 8/2007 | Bainbridge et al. |
| 2008/0195700 | A1* | 8/2008 | Jonsson ...................... 709/203 |
| 2008/0212598 | A1* | 9/2008 | Kolli et al. .................. 370/409 |
| 2009/0129386 | A1* | 5/2009 | Rune .......................... 370/392 |
| 2009/0141717 | A1* | 6/2009 | Cabeca et al. ............... 370/389 |
| 2009/0190584 | A1* | 7/2009 | Gemmer et al. ............. 370/390 |

FOREIGN PATENT DOCUMENTS

| | | | |
|---|---|---|---|
| WO | 0219656 A1 | 3/2002 | |

OTHER PUBLICATIONS

Technical Report, DSL Forum TR-01: "Migration to Ethernet-Based DSL Aggregation", XP-002411174, Apr. 2006, pp. 1-101.

Technology White Paper, "New Service Architectures for DSL Networks", XP-002316275, Nov. 30, 2003, pp. 1-12.

M. Patrick Motorola, Network Work Working Group, "DHCP Relay Agent Information Option", RFC: 3046, Jan. 2001, pp. 1-15.

International Search Report from PCT/US2007/002461 date mailed May 29, 2007, pp. 4.

Droms, R., "Dynamic Host Configuration Protocol", RFC 2131, http://www.faqs.org/rfcs/rfc2131.html, published Mar. 1997., pp. 1-45.

Alexander, S., et al., "DHCP Options and BOOTP Vendor Extensions", RFC 2132, http://www.faqs.org/rfcs/rfc2132.html, published Mar. 1997, pp. 1-34.

Patrick, M., "DHCP Relay Agent Information Option", RFC 3046, http://www.faqs.org/rfcs/rfc3046.html, published Jan. 2001, pp. 1-14.

* cited by examiner

FIG. 6

AUTOMATICALLY CONTROLLING OPERATION OF A BRAS DEVICE BASED ON ENCAPSULATION INFORMATION

BACKGROUND

A Digital Subscriber Line Access Multiplexer (DSLAM) is a network device that is capable of receiving upstream signals from multiple subscribers (e.g., Customer Premises Equipment or CPE) and aggregating these upstream signals onto backbone switching equipment such as a Broadband Remote Access Server (BRAS) of a Network Service Provider (NSP). In a typical CPE/DSLAM/BRAS layout, the communications between the CPE and DSLAM is ATM-based (e.g., Point-to-Point over asynchronous transfer mode or PPPoA) while the communications between the DSLAM and the BRAS is generally packet-based.

A number of standards are available which enable encapsulation of Local Area Network (LAN) and Wide Area Network (WAN) protocols over ATM (e.g., AAL5, AAL3, RBE, PPPoE/PPPoA, IPoA, IMA, and so on). Such standards provide different alternatives for integrating ATM communications into existing WAN and/or LAN communications.

Moreover, since packets can be quite large (e.g., 8,000 bytes in length) but ATM cells are fixed at 53 bytes in length (i.e., the first 5 bytes being header information and the remaining 48 bytes being reserved for data), the overhead cost of using ATM is relatively high. That is, relatively speaking, the 5-byte header is an excessive overhead cost and cuts into the amount of data that can be transferred between the CPE and the DSLAM. Along these lines, the term "ATM cell tax" is often used to describe the overhead cost imposed by ATM cells.

Nevertheless, providers typically offer Quality of Service (QoS) support to their subscribers, and thus intelligently apportion data within the fixed 48-byte data fields of ATM cells in a hands-on manner. One way to accomplish this hands-on apportionment is for the providers to manually configure BRAS equipment to control the downstream flow of network traffic with knowledge that packetized communications between the BRAS and the DSLAM will then face ATM encapsulation from the DSLAM to the CPE. In particular, technicians of the providers manually enter knowledge of the downstream protocols in use from the DSLAM to the CPE (e.g., PPPoA) and a conversion scheme which appropriately accounts for the ATM cell tax. Such operation involves the technicians entering such information through a command line interface (CLI) of the BRAS equipment.

For example, if the BRAS receives a 64-byte packet en route to the DSLAM and if the BRAS knows that the DSLAM will split the 64-byte packet into two 53-byte ATM cells, the BRAS can impose a level of flow control which is commensurate for two 53-byte ATM cells (i.e., 106 bytes in total). Accordingly, the BRAS may impose a scheme for shaping and policing the downstream flow which is more favorable to the DSLAM. As a result, the operation of the DSLAM can be improved (e.g., less dropped packets, enhanced ability to preserve packet priorities, etc.). It should be understood that different encapsulations will have different overhead and thus require different computations.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

Unfortunately, the above-described conventional approach, which involves technicians manually configuring BRAS equipment to account for a particular ATM encapsulation scheme, suffers from a variety of deficiencies. For example, it is extremely burdensome for technicians to manually configure the BRAS equipment through a CLI. That is, each configuration endeavor is labor intensive and susceptible to human error. Furthermore, such manual configuring may significantly slow down the process of adding new subscribers. Furthermore, whenever the encapsulation between the DSLAM and the subscriber (CPE) changes, the technicians of the providers need to manually update the knowledge of the changed encapsulation in the BRAS device.

In contrast to the above-described conventional approach to manually configuring BRAS equipment to account for a particular ATM encapsulation scheme, an improved technique involves automatically controlling operation of a BRAS device (i.e., a data communications device configured to perform BRAS operations) based on encapsulation information obtained from communications flowing through a DSLAM device (i.e., a data communications device configured to perform DSLAM operations) and the BRAS device. Such encapsulation information (e.g., the particular type or types of ATM encapsulation) is easily acquired by the BRAS device (e.g., from a exchange of Dynamic Host Configuration Protocol or DHCP messages between the CPE and a DHCP server passing through the DSLAM and BRAS devices) thus removing the burden of a technician having to configure the BRAS device manually. Accordingly, the time delays, human error risks and related burdens associated with a technician manually configuring the BRAS device are alleviated.

One embodiment is directed to a method of controlling operation of a BRAS device. The method includes extracting encapsulation information from a communications exchange between a CPE device and an external server device (e.g., a DHCP server). The communications exchange passes through the BRAS device and a DSLAM device. The method further includes storing the encapsulation information in local memory of the BRAS device, and controlling a flow of a downstream communication passing through the BRAS device and the DSLAM device toward the CPE device based on the encapsulation information stored in the local memory of the BRAS device. Accordingly, the BRAS device is well suited for performing ATM overhead accounting as well as shaping and policing downstream traffic.

Description of Example Embodiments

Figure 1:
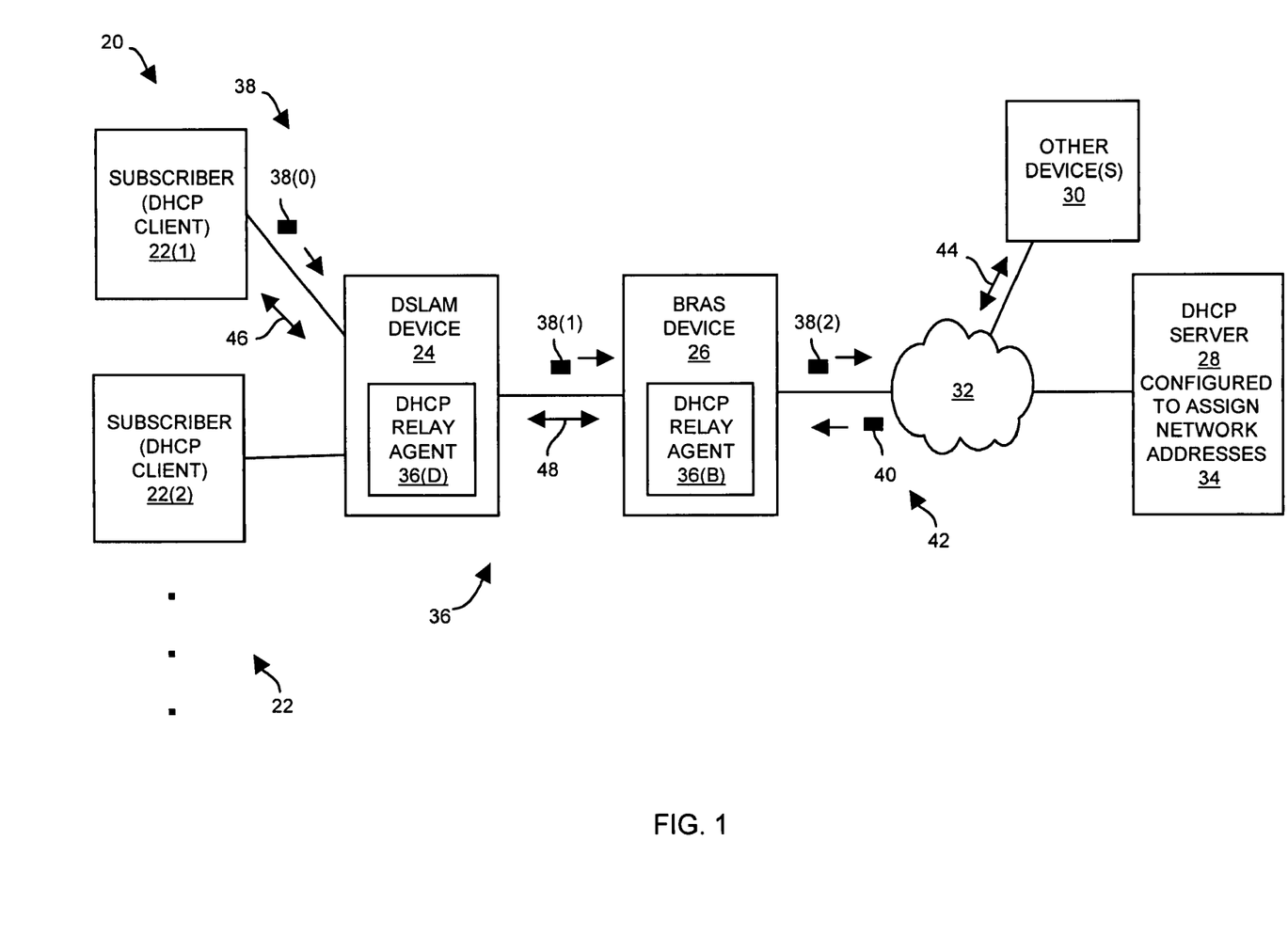
FIG. 1 is a block diagram of a system having a BRAS device configured to operate based on encapsulation information obtained from communications flowing through a DSLAM device and the BRAS device.

FIG. 1 shows a system 20 having a BRAS device configured to operate based on encapsulation information obtained from communications flowing through a DSLAM device and the BRAS device. The system 20 includes multiple subscribers 22(1), 22(2), . . . (collectively, subscribers 22), a DSLAM device 24, a BRAS device 26, and a DHCP server 28. The subscribers 22, the DSLAM device 24, the BRAS device 26, the DHCP server 28 as well as one or more other devices 30 are configured to communicate with each other through a communications fabric 32 (e.g., copper wire, fiber optic cable, wireless medium, related data communications devices, combinations thereof, etc.). It should be understood that other components (e.g., firewalls, routers, switches, bridges, gateways, etc.) can be considered to belong to the system 20 as well.

Each subscriber 22 is customer premises equipment which is configured to acquire a network address 34 using DHCP. In particular, each subscriber 22 is configured to operate as a DHCP client that obtains and renews an IP network address from the DHCP server 28. To facilitate such operation, the DSLAM device 24 includes an enhanced DHCP relay agent 36(D), and the BRAS device 26 includes another enhanced DHCP relay agent 36(B). The DHCP relay agents 36(D), 36(B) (collectively, DHCP relay agents 36) are configured to relay DHCP messages 38 from the CPE upstream to the DHCP server 28. The DHCP relay agents 36 are further configured to relay DHCP messages 40 from the DHCP server 28 downstream to the CPE.

Moreover, the DHCP relay agent 36(D) is configured to receive upstream DHCP messages 38(0) and add a "Relay Agent Information" option (e.g., option code "82" information) thus generating DHCP messages 38(1). Similarly, the DHCP relay agent 36(B) are configured to receive upstream DHCP messages 38(1) and add a "Relay Agent Information" option thus generating DHCP messages 38(2). A description of DHCP options is provided in a publication entitled "RFC 2132—DHCP Options and BOOTP Vendor Extensions" by S. Alexander and R. Droms, dated March 1997, the teachings of which are hereby incorporated by reference in their entirety.

Along these lines and as will be explained in further details later, the DHCP relay agent 36(D) is configured to participate in the addition of encapsulation information within DHCP communications through the system 20, while the DHCP relay agent 36(B) is configured to automatically acquire the encapsulation information from the DHCP communications and then shape and police downstream traffic based on the acquired encapsulation information. In contrast to conventional approaches for ATM overhead accounting, such operation by the enhanced DHCP relay agents 36 occurs dynamically and without the need for any manual adjustment thus saving substantial set-up time and effort. At this point, it should be understood that a suitable network topology for the system 20 is that of WT-101 where the DSLAM device 24 operates as an access node and is configured to add DHCP relay agent information containing information on the port (e.g., DSL line) of the subscriber 22 requesting an IP network address 34.

To obtain an IP network address 34, the subscriber 22 outputs DHCP client messages 38 (e.g., DHCPDISCOVER, DHCPREQUEST, etc.) to the DHCP server 28. The DHCP server 28 responds to the DHCP client messages 38 from the subscriber 22 with DHCP server messages 40 (e.g., DHCPOFFER, DHCPACK, etc.). Some or all of these DHCP messages 38, 40 between the subscriber 22 and the DHCP server 28 (collectively, DHCP signals 42) may be forwarded and embellished by the DHCP relay agents 36(D), 36(B) (collectively, relay agents 36). In this manner, IP addresses are robustly and reliably assigned and managed within the system 20. A suitable technique for exchanging DHCP information which involves multiple DHCP relay agents is described in U.S. patent application Ser. No. 11/495,273, entitled "TECHNIQUES FOR EXCHANGING DHCP INFORMATION AMONG DHCP RELAY AGENTS AND DHCP SERVERS", the entire teachings of which are hereby incorporated by reference.

Once the subscribers 22 have obtained network addresses from the DHCP server 28, the subscribers 22 are then well-equipped to exchange signals 44 with a variety of external devices (e.g., the device 30). For example, the subscribers 22 can then operate as subscriber edge devices that obtain web content from various web servers over the Internet.

It should be understood that, within the flow of the DHCP signals 42 is encapsulation information which identifies the type of ATM encapsulation carried out for communications 46 between the subscribers 22 and the DSLAM device 24 (i.e., the particular protocols utilized in communications flowing through the final leg extending between the DSLAM device 24 and CPE). The BRAS device 26 is configured to (i) automatically obtain such information from the DHCP signals 42 and then (ii) control the manner in which communications 48 flow between the BRAS device 26 and the DSLAM device 24 based on that information (i.e., the communications leg between the BRAS device 26 and the DSLAM device 24). In particular, the BRAS device 26 is configured to determine the particular ATM cell tax incurred due to ATM encapsulation for the edge communications 46 and thus throttle the edge communications 46 in the downstream direction to preserve QoS to the subscribers 22. Such ATM overhead accounting enhances subscriber QoS (e.g., provides less dropped packets, enhances the ability of the system 20 to preserve packet priorities, etc.) but without the burden of forcing technicians to manually configure a BRAS as in conventional approaches.

For example, based on the encapsulation information automatically gathered by monitoring the DHCP signals 42, suppose that the BRAS device 26 determines that the type of ATM encapsulation employed between the subscribers 22 and the DSLAM device 24 results in 53-byte ATM cell transmissions with 5-byte headers. That is, the DSLAM device 24 will split a 64-byte packet from the BRAS device 26 into two 53-byte ATM cells. Armed with this knowledge, the BRAS device 26 is capable of controlling the rate of data flowing in the downstream direction to the CPE (e.g., throttling packets, dropping lower priority packets, combining or dividing packets, classifying and queuing packets, etc.) so that the subscribers 22 properly receive their prescribed QoS. Further details will now be provided with reference to FIG. 2.

Figure 2:
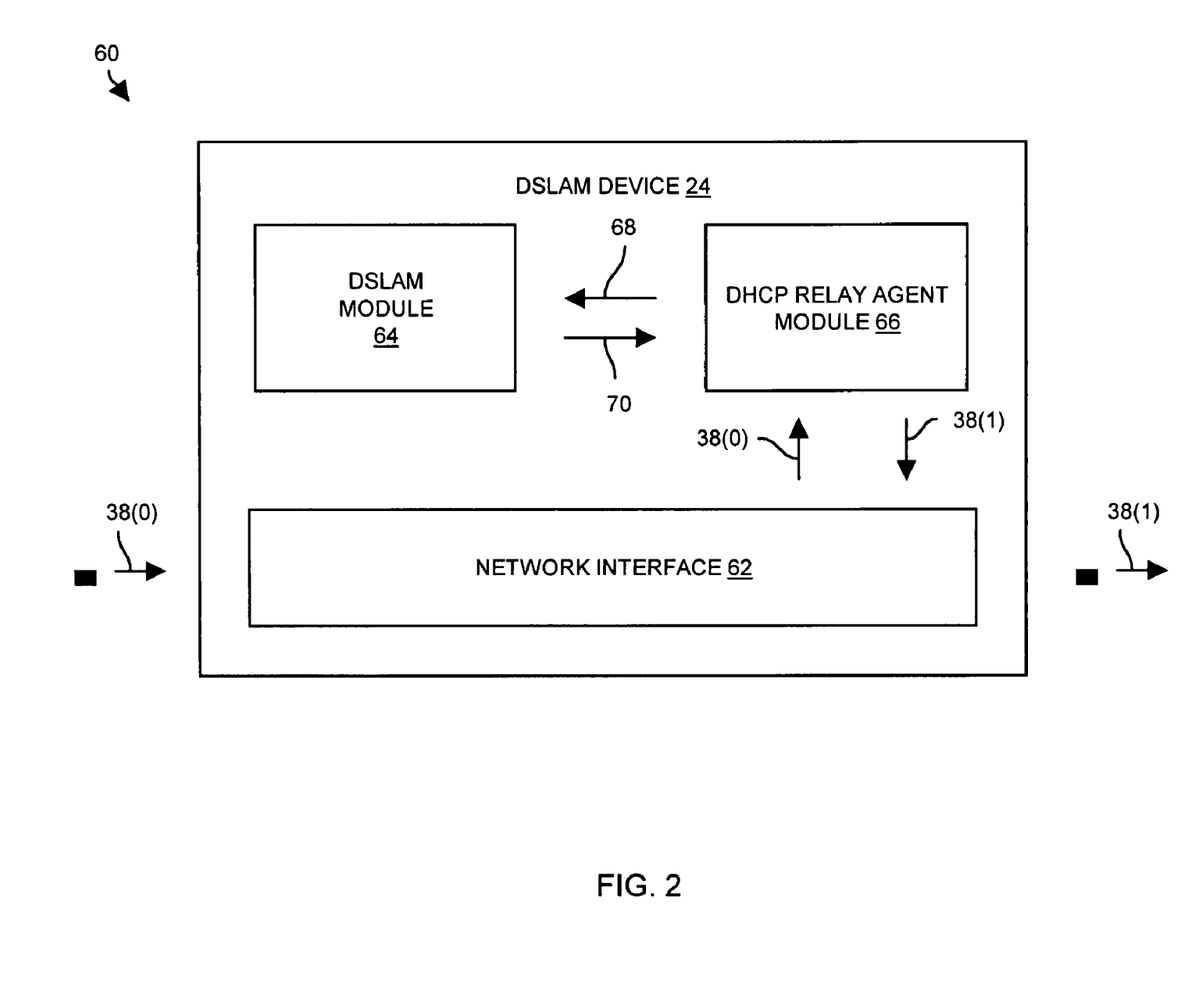
FIG. 2 is a block diagram of the DSLAM device of FIG. 1.

FIG. 2 is a detailed view 60 of the DSLAM device 24. The DSLAM device 24 includes a network interface 62, a DSLAM module 64 and the DHCP relay agent module 66. The DHCP relay agent module 66 corresponds to the DHCP relay agent 36(D) in FIG. 1. The DSLAM module 64 is configured to perform DSLAM operations such as aggregate communications of the multiple subscribers 22. The DHCP relay agent 66 is configured to perform DHCP relay agent operations (e.g., operate as an intermediate device between a DHCP client and a DHCP server for relaying DHCP messages).

In some arrangements, the DSLAM module 64 and the DHCP relay agent module 66 operate on separate designated circuits within the DSLAM device 24. In other arrangements, the DSLAM module 64 and the DHCP relay agent module 66 run on the same circuitry (e.g., as different processes or threads on the same set of processors). In all of these arrangements, the DSLAM module 64 and the DHCP relay agent module 66 are configured to communicate with each other (e.g., via one or more internal communications buses, via one or more inter-process communications schemes, via operating system and/or application programming interfaces, combinations thereof, etc.).

In the manner of traditional DHCP relay agents, the DHCP relay agent module 66 conveys the DHCP messages 42 between the subscribers 22 and the DHCP server 28 (also see FIG. 1). However, the DHCP relay agent module 66 is further configured to add encapsulation information as relay agent information under option code "82" (e.g., also see RFC 2132) to the upstream DHCP messages 38 and to extract such relay agent information from corresponding downstream DHCP messages 40. Along these lines, the network interface 62 is configured to receive a DHCP client message 38(0) from a subscriber 22 and provide the DHCP client message 38(0) to the DHCP relay agent module 66. The DHCP relay agent 66 is configured to then send a request 68 to the DSLAM module 64 asking for the type or types of encapsulation employed for the communications 46 between the subscribers 22 and the DSLAM device 24 (FIG. 1). It will be appreciated that a variety of protocols are available for use such as AAL5, AAL3, RBE, PPPoE/PPPoA, IPoA, IMA, and so on. Upon receipt of a response 70 indicating the type or types of encapsulation carried out for the communications 46, the DHCP relay agent 66 inserts one or more identifiers which identifies the type or types of encapsulation as contents of a relay agent information option (e.g., option code "82") within the DHCP client message 38(1) and then provides this embellished DHCP client message 38(1) to the network interface 62 which forwards the DHCP message 38(1) upstream.

It should be understood that the DSLAM module 64 is configured to continue to provide the encapsulation information within subsequent DHCP messages from the same subscribers 22 (i.e., DHCP clients) during IP address renewal operations. That is, when the subscribers 22 send new DHCP messages 36 to the DHCP server 28 to renew their network addresses, the DSLAM module 64 adds the encapsulation information for these clients to the DHCP messages 36 to continuously inform the BRAS device 26 of the type of ATM encapsulation carried out on behalf of the subscribers 22. Further details will now be provided with reference to FIG. 3.

Figure 3:
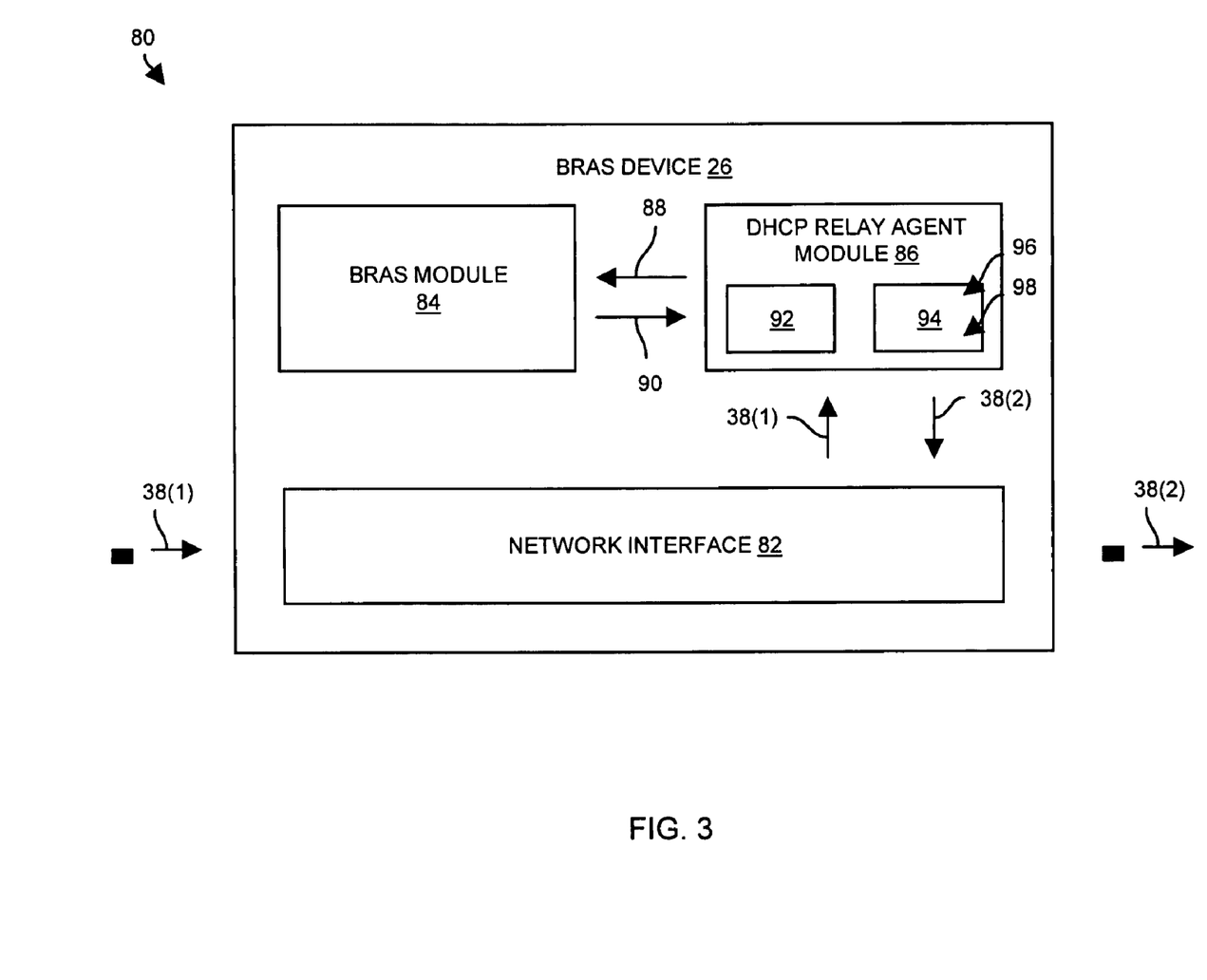
FIG. 3 is a block diagram of the BRAS device of FIG. 1.

FIG. 3 is a detailed view 80 of the BRAS device 26. The BRAS device 26 includes a network interface 82, a BRAS module 84, and a DHCP relay agent module 86. The DHCP relay agent module 86 corresponds to the DHCP relay agent 36(B) in the BRAS device 26 (also see FIG. 1). The BRAS module 84 is configured to perform BRAS operations such as aggregation and injection of IP QoS in Regional/Access Network portion of the network 32 (also see FIG. 1). The DHCP relay agent 86 is configured to perform traditional DHCP relay agent operations (e.g., operate as an intermediate device between a DHCP client and a DHCP server for enhanced DHCP functionality) as well as obtain encapsulation information from the DHCP messages 42 and provide that encapsulation information to the BRAS module 84. Communications between the BRAS module 84 and the DHCP relay agent module 86 is illustrated by arrows 88 and 90 in FIG. 3. Since the BRAS module 84 is the last IP aware device between the Regional/Access Network portion and the customer network, the BRAS module 84 provides congestion management (i.e., synthesized IP QoS through the DSLAM device 24) for maintained QoS at the CPE, i.e., the subscribers 22.

In some arrangements, the BRAS module 84 and the DHCP relay agent module 86 operate on separate designated circuits within the BRAS device 26. In other arrangements, the BRAS module 84 and the DHCP relay agent module 86 run on the same circuitry (e.g., as different processes or threads on the same set of processors). In all arrangements, the BRAS module 84 and the DHCP relay agent module 86 are configured to communicate with each other (e.g., via one or more internal communications buses, via one or more inter-process communications schemes, via operating system and/or application programming interfaces, combinations thereof, etc.).

As further shown in FIG. 3, the DHCP relay agent 86 includes a controller 92 and memory 94. The controller 92 is configured to extract the encapsulation information from the DHCP communications exchange 42 between the subscribers 22 (i.e., DHCP clients) and the DHCP server 28. The controller 92 stores this encapsulation information in the memory 94. As a result, the BRAS module 84, is capable of controlling the flow of downstream communications passing through the BRAS and DSLAM devices 24, 26 based on the encapsulation information.

In some arrangements, the encapsulation information is stored in the memory 94 as an entry of a database 96 of multiple entries 98. In these arrangements, each entry 98 corresponds to a particular subscriber 22 and the particular form of ATM overhead accounting carried out for that subscriber 22.

Furthermore, in some arrangements, the memory 94 and the database 96 resides within and is managed by the BRAS module 84 rather than the DHCP relay agent module 86. In these arrangements, the DHCP relay agent module 86 simply conveys the encapsulation information to the BRAS module 84 as part of its communications 88, 90 (see FIG. 3) with the BRAS module 84.

It should be understood that the DHCP relay agent module 86 is configured to continue to provide the encapsulation information from subsequent DHCP communications 42 to the BRAS module 84 during IP address renewal operations. That is, when the subscribers 22 send new DHCP messages 38 to the DHCP server 28 to renew their network addresses, the DSLAM device 24 (FIG. 1) adds the encapsulation information for these clients to the DHCP messages 38. The DHCP relay agent module 86 (FIG. 3) then extracts this encapsulation information from the DHCP communications 42 (i.e., either the upstream DHCP messages 38 or the downstream DHCP messages 40) to continuously inform the BRAS module 84 of the type of ATM encapsulation carried out on behalf of the subscribers 22.

At this point, it should be understood that there are different operating modes in which the DHCP relay agent module 86 is capable of obtaining the encapsulation information from the DHCP messages 42. In one operating mode, the DHCP relay agent module 86 is configured to snoop the encapsulation information from upstream DHCP messages 38 from the DSLAM device 24 en route to the DHCP server 28. In another operating mode, the DHCP relay agent module 86 is configured obtain the encapsulation information from the DHCP server 28 within downstream DHCP response messages 40 from the DHCP server 28. Further details of these two different operating modes will now be provided with reference to FIGS. 4 and 5.

Figure 4:
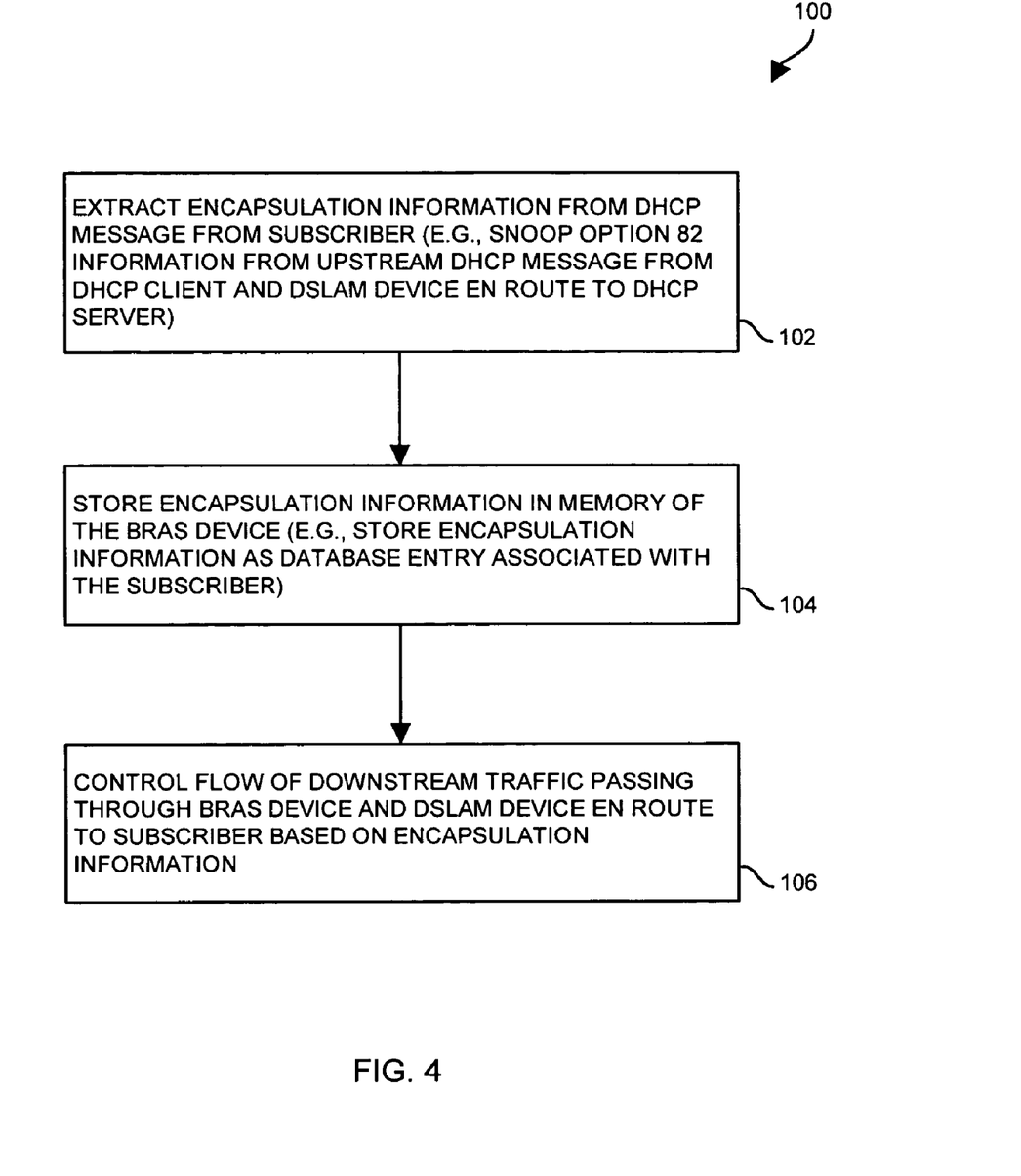
FIG. 4 is a flowchart of a procedure performed by the BRAS device of FIG. 3 in accordance with a first operating mode.

FIG. 4 is a flowchart of a procedure 100 performed by the BRAS device 26 in accordance with a first operating mode in which the BRAS device 26 snoops upstream DHCP messages 38. In step 102, the network interface 82 of the BRAS device 26 receives a DHCP message 38 en route from a particular subscriber 22 through the DSLAM device 24 to the DHCP server 28. Recall that in the description above, the DSLAM device 24 is configured to add the type(s) of ATM encapsulation as Option 82 information within the DHCP messages 38. The DHCP relay agent module 86 of the BRAS device 26 then extracts the encapsulation information from DHCP messages 38.

In step 104, the DHCP relay agent module 86 stores the encapsulation information in the memory 94. In some arrangements, the DHCP relay agent module 86 stores the encapsulation information as a database entry 98 associated with the particular subscriber 22 (see the database 96 in FIG. 3).

In step 106, the BRAS module 84 of the BRAS device 26 then controls the flow of a downstream communication passing through the BRAS device 26 and the DSLAM device 24 toward the subscriber 22 based on the encapsulation information stored in the memory 94. For example, the BRAS module 84 is capable of throttling downstream traffic from other devices (see the device 30 in FIG. 1), dropping lower priority packets, combining or dividing packets, classifying and queuing packets, and so on, so that the subscribers 22 properly receive their prescribed QoS. Accordingly, the BRAS device 26 robustly and reliably shapes and polices traffic to maintain QoS for the subscriber 22.

Figure 5:
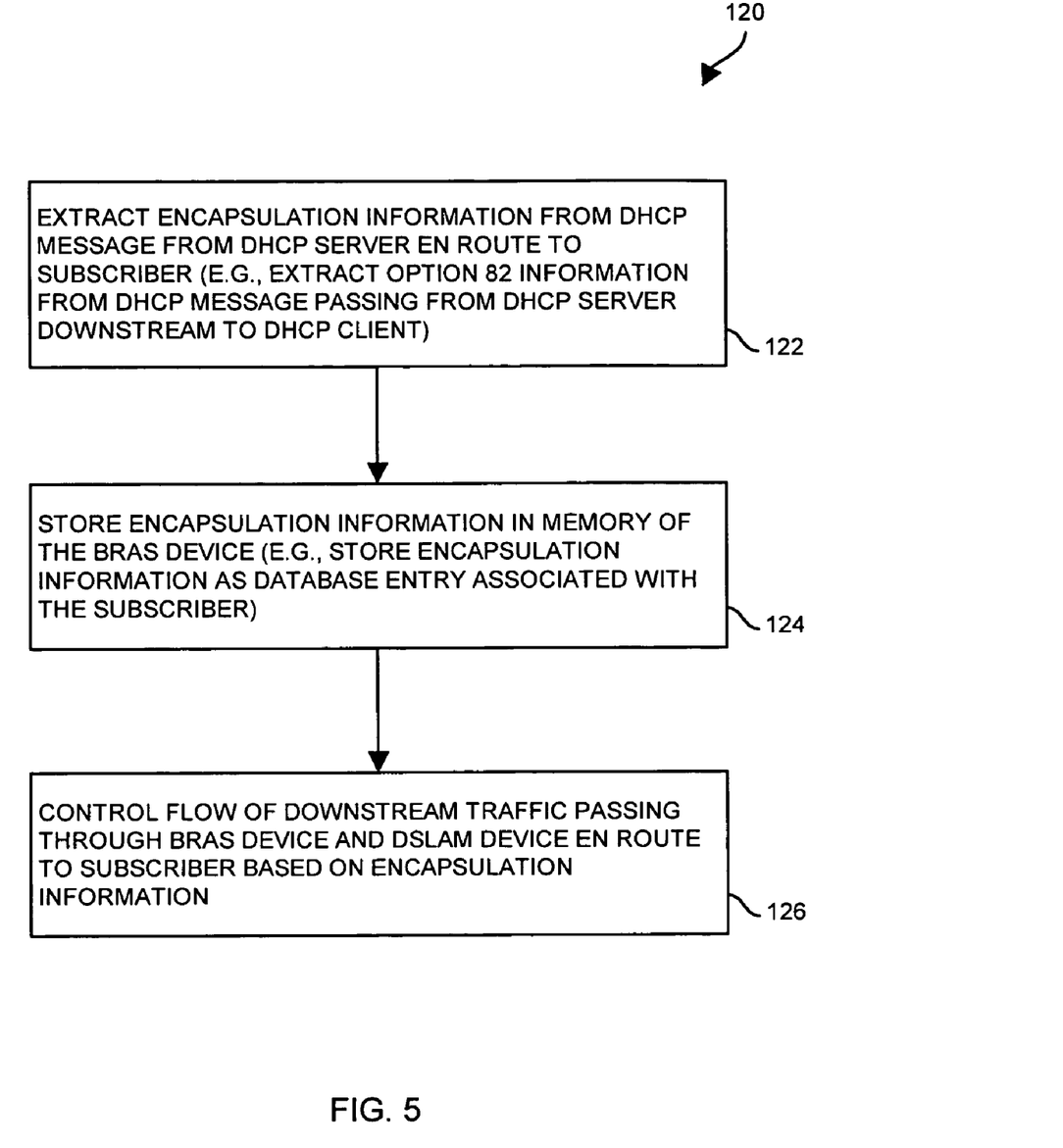
FIG. 5 is a flowchart of a procedure performed by the BRAS device of FIG. 3 in accordance with a second operating mode.

FIG. 5 is a flowchart of a procedure 120 performed by the BRAS device 26 in accordance with a second operating mode in which the BRAS device 26 receives direction from the DHCP server through downstream DHCP messages 40 (FIG. 1). Prior to operation, the DHCP server 28 is configured to respond to DHCP messages 38, which have been specially marked by the BRAS device 26, with directions for handling ATM overhead accounting. Accordingly, the BRAS device 26 marks upstream DHCP messages 38 (e.g., using the Option 82 relay agent information feature) and then awaits direction from the DHCP server 28, such directions being piggybacked on the downstream DHCP responses.

In step 122, the network interface 82 of the BRAS device 26 receives a DHCP message 40 en route from the DHCP server 28 back to a particular subscriber 22 in response to an earlier DHCP request message 38. In particular, the subscriber 22 sent that DHCP request message 38 upstream to obtain an assigned network address 34 from the DHCP server 28. As that DHCP request message 38 traveled upstream through the DSLAM device 24, the DSLAM device 24 added encapsulation information as Option 82 information to the DHCP request message 38. The DHCP server 28 then generated the DHCP response message 40 and provided further encapsulation information within the DHCP response message 40 (e.g., as Option 82 information) to direct the BRAS device 26. Accordingly, the DHCP relay agent module 86 of the BRAS device 26 then extracts the encapsulation information from DHCP messages 40.

In step 124, the DHCP relay agent module 86 stores the encapsulation information in the memory 94 in a manner similar to that described above in connection with FIG. 4. For example, in some arrangements, the DHCP relay agent module 86 stores the encapsulation information as a database entry 98 associated with the particular subscriber 22 (see the database 96 in FIG. 3).

In step 126, the BRAS module 84 of the BRAS device 26 then controls the flow of a downstream communication passing through the BRAS device 26 and the DSLAM device 24 toward the subscriber 22 based on the encapsulation information stored in the memory 94. For instance, once the subscriber 22 is operational and begins acquiring content from other devices 30 through the network 32, the BRAS module 84 is capable of throttling packets, dropping lower priority packets, combining or dividing packets, classifying and queuing packets, and so on so that the subscribers 22 properly receive their prescribed QoS. As a result, the BRAS device 26 robustly and reliably shapes and polices traffic to maintain QoS for the subscriber 22.

Figure 6:
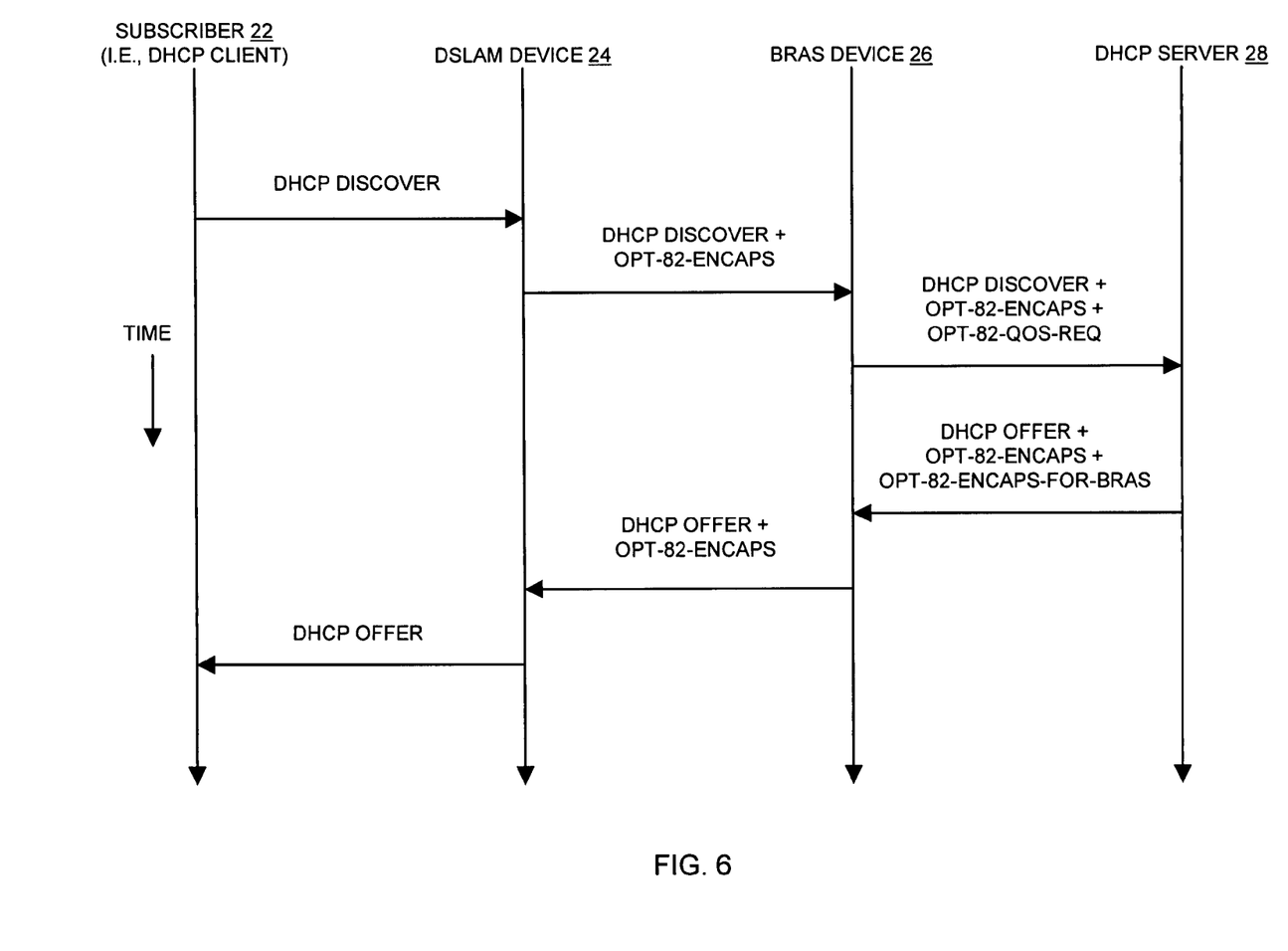
FIG. 6 is a timing diagram illustrating the DHCP information exchange between various devices during the procedure of FIG. 5.

FIG. 6 illustrates an exemplary DHCP exchange involving the various devices 22, 24, 26, 28 of the system 20 over time. As shown in FIG. 6, the DSLAM device 24 adds the type of ATM encapsulation as DHCP relay agent information, i.e., represented in FIG. 6 as OPT-82-ENCAPS, within an upstream DHCP message 38. The BRAS device 26 adds further DHCP relay agent information indicating to the DHCP server 28 that the zBRAS device 26 requests direction as to how to perform ATM overhead accounting for downstream traffic, i.e., represented in FIG. 6 as OPT-82-QOS-REQ.

In the return direction, the DHCP server 28 replaces the DHCP relay agent information of the BRAS device 26 with direction as to how to perform ATM overhead accounting for downstream traffic, i.e., represented in FIG. 6 as OPT-82-ENCAPS-FOR-BRAS. Such information is capable of being added automatically by the DHCP server 28 (e.g., based on a lookup procedure from a predefined table within the DHCP server 28) thus alleviating the need for a technician to manually configure the BRAS device 26. Next, the BRAS device 26 extracts the direction from the DHCP server 28 and subsequently shapes and polices traffic passing through the BRAS device 26 and the DSLAM device 24 en route to the subscriber 22 based on this direction.

As described above, embodiments of the invention are directed to techniques for automatically controlling operation of a BRAS device 26 based on encapsulation information (e.g., an identifier of the type or types of encapsulation) obtained from communications flowing through a DSLAM device 24 and the BRAS device 26. Such encapsulation information is easily acquired (e.g., through monitoring of DHCP messages 42) thus removing the burden of configuring the BRAS device 26 manually (e.g., by a technician) in order to account for encapsulation overhead.

While various embodiments of the invention have been particularly shown and described, it will be understood by those skilled in the art that various changes in form and details may be made therein without departing from the spirit and scope of the invention as defined by the appended claims.

What is claimed is:

1. A method to control operation of a Broadband Remote Access Server (BRAS) device, the method comprising:
    extracting encapsulation information from a communications exchange between a Customer Premises Equipment (CPE) device and an external server device, the communications exchange passing through the BRAS device and a Digital Subscriber Line Access Multiplexer (DSLAM) device;
    storing the encapsulation information in local memory of the BRAS device;
    controlling a flow of a downstream communication passing through the BRAS device and the DSLAM device toward the CPE device based on the encapsulation information stored in the local memory of the BRAS device;
    wherein the external server device is a DHCP server;
    wherein the CPE device is an end-user device;

wherein the DSLAM device is disposed between the end-user device and the BRAS device;
wherein extracting the encapsulation information from the communications exchange between the CPE device and the external server device includes:
  reading, by the BRAS device, contents from a portion of a DHCP message which is en route from the DHCP server to the end-user device through the BRAS device and subsequently the DSLAM device to assign an Internet Protocol (IP) address to the end-user device, the contents indicating that the end-user device and the DSLAM device are constructed and arranged to exchange Transmission Control Protocol/Internet Protocol (TCP/IP) packets by (i) encapsulating portions of the TCP/IP packets within series of Asynchronous Transfer Mode (ATM) cells and (ii) exchanging the series of ATM cells, having the encapsulated portions of the TCP/IP packets therein, over a Digital Subscriber Line disposed between the end-user device and the DSLAM device;
  receiving, at the BRAS device, a set of TCP/IP packets from a TCP/IP packet source which is different than the DHCP server, the set of TCP/IP packets being en route from the TCP/IP packet source to the end-user device through the BRAS device and subsequently the DSLAM device; and
  incrementally outputting each TCP/IP packet of the set of TCP/IP packets at a predetermined data rate to direct the DSLAM device, when (i) dividing the TCP/IP packets into portions, (ii) encapsulating those portions within a stream of ATM cells, and sending the stream of ATM cells to the end-user device through the Digital Subscriber Line, to provide a Quality of Service at the particular data rate to the end-user.

2. A method as in claim 1 wherein the external server device is configured to operate as a Dynamic Host Configuration Protocol (DHCP) server; and wherein extracting the encapsulation information includes:
  obtaining the encapsulation information from a DHCP message sent between the CPE device and the DHCP server through the DSLAM device and the BRAS device.

3. A method as in claim 2 wherein obtaining the encapsulation information from the DHCP message includes:
  reading contents of a DHCP Option 82 portion of the DHCP message, the contents identifying one of a variety of encapsulation protocols.

4. A method as in claim 3 wherein reading the contents of the DHCP Option 82 portion of the DHCP message includes:
  identifying, based on the contents of the DHCP Option 82 portion of the DHCP message, a particular encapsulation protocol employed by the DSLAM device on communications between the DSLAM device and the CPE device.

5. A method as in claim 3 wherein the contents of the DHCP Option 82 includes data added by a DHCP relay agent running on the DSLAM device; and wherein reading the contents of the DHCP Option 82 portion of the DHCP message includes:
  acquiring the data added by the DHCP relay agent running on the DSLAM device.

6. A method as in claim 3 wherein the contents of the DHCP Option 82 includes information added by the DHCP server in response to data provided by a DHCP relay agent running on the DSLAM device; and
  wherein reading the contents of the DHCP Option 82 portion of the DHCP message includes:
    acquiring the information added by the DHCP server in response to the data provided by a DHCP relay agent running on the DSLAM device.

7. A method as in claim 3 wherein the local memory of the BRAS device holds a database having a set of entries corresponding to a set of subscribers; wherein storing the encapsulation information in the local memory of the BRAS device includes saving the encapsulation information in a particular entry of the set of entries of the database; and
wherein controlling the flow of the downstream communication includes:
  automatically adjusting bandwidth of the downstream communication based on the encapsulation information in the particular entry of the set of entries of the database.

8. A Broadband Remote Access Server (BRAS) device, comprising:
  a network interface;
  local memory; and
  a controller coupled to the network interface and the local memory, the controller being configured to:
    extract encapsulation information from a communications exchange between a Customer Premises Equipment (CPE) device and an external server device, the communications exchange passing through (i) the network interface of the BRAS device and (ii) a Digital Subscriber Line Access Multiplexer (DSLAM) device,
    store the encapsulation information in the local memory, and
    control a flow of a downstream communication passing through (i) the network interface of the BRAS device and (ii) the DSLAM device toward the CPE device based on the encapsulation information stored in the local memory;
  wherein the external server device is a DHCP server;
  wherein the CPE device is an end-user device;
  wherein the DSLAM device is disposed between the end-user device and the BRAS device;
  wherein the controller, when extracting the encapsulation information from the communications exchange between the CPE device and the external server device, is configured to:
    read contents from a portion of a DHCP message which is en route from the DHCP server to the end-user device through the BRAS device and subsequently the DSLAM device to assign an Internet Protocol (IP) address to the end-user device, the contents indicating that the end-user device and the DSLAM device are constructed and arranged to exchange Transmission Control Protocol/Internet Protocol (TCP/IP) packets by (i) encapsulating portions of the TCP/IP packets within series of Asynchronous Transfer Mode (ATM) cells and (ii) exchanging the series of ATM cells, having the encapsulated portions of the TCP/IP packets therein, over a Digital Subscriber Line disposed between the end-user device and the DSLAM device; and
  wherein the controller is further configured to:
    receive a set of TCP/IP packets from a TCP/IP packet source which is different than the DHCP server, the set of TCP/IP packets being en route from the TCP/IP packet source to the end-user device through the BRAS device and subsequently the DSLAM device; and
    incrementally output each TCP/IP packet of the set of TCP/IP packets at a predetermined data rate to direct the DSLAM device, when (i) dividing the TCP/IP packets into portions, (ii) encapsulating those portions within a stream of ATM cells, and sending the stream of ATM cells to the end-user device through the Digital Subscriber Line, to provide a Quality of Service at the particular data rate to the end-user.

9. A BRAS device as in claim 8 wherein the external server device is configured to operate as a Dynamic Host Configuration Protocol (DHCP) server; and wherein the controller, when extracting the encapsulation information, is configured to:
obtain the encapsulation information from a DHCP message sent between the CPE device and the DHCP server through the DSLAM device and the BRAS device.

10. A BRAS device as in claim 9 wherein the controller, when obtaining the encapsulation information from the DHCP message, is configured to:
read contents of a DHCP Option 82 portion of the DHCP message, the contents identifying one of a variety of encapsulation protocols.

11. A BRAS device as in claim 10 wherein the controller, when reading the contents of the DHCP Option 82 portion of the DHCP message, is configured to:
identify, based on the contents of the DHCP Option 82 portion of the DHCP message, a particular encapsulation protocol employed by the DSLAM device on communications between the DSLAM device and the CPE device.

12. A BRAS device as in claim 10 wherein the contents of the DHCP Option 82 includes data added by a DHCP relay agent running on the DSLAM device; and wherein the controller, when reading the contents of the DHCP Option 82 portion of the DHCP message, is configured to:
acquire the data added by the DHCP relay agent running on the DSLAM device.

13. A BRAS device as in claim 10 wherein the contents of the DHCP Option 82 includes information added by the DHCP server in response to data provided by a DHCP relay agent running on the DSLAM device; and wherein the controller, when reading the contents of the DHCP Option 82 portion of the DHCP message, is configured to:
acquire the information added by the DHCP server in response to the data provided by a DHCP relay agent running on the DSLAM device.

14. A BRAS device as in claim 10 wherein the local memory of the BRAS device holds a database having a set of entries corresponding to a set of subscribers;
wherein the controller, when storing the encapsulation information in the local memory of the BRAS device, is configured to save the encapsulation information in a particular entry of the set of entries of the database; and
wherein the controller, when controlling the flow of the downstream communication, is configured to automatically adjust bandwidth of the downstream communication based on the encapsulation information in the particular entry of the set of entries of the database.

15. A BRAS device as in claim 14 wherein the controller, when automatically adjusting the bandwidth of the downstream communication, is configured to:
perform asynchronous transfer mode (ATM) overhead accounting and shaping of the downstream communication to optimize traffic between the DSLAM device and the CPE device.

16. A BRAS device as in claim 14 wherein the controller is further configured to:
obtain updated encapsulation information from a DHCP lease renewal exchange between the CPE device and the DHCP server; and
update the particular entry of the set of entries of the database based on the updated encapsulation information.

17. A Broadband Remote Access Server (BRAS) device, comprising:
a network interface;
local memory; and
a controller coupled to the network interface and the local memory, the controller including:
means for extracting encapsulation information from a communications exchange between a Customer Premises Equipment (CPE) device and an external server device, the communications exchange passing through (i) the network interface of the BRAS device and (ii) a Digital Subscriber Line Access Multiplexer (DSLAM) device,
means for storing the encapsulation information in the local memory, and
means for controlling a flow of a downstream communication passing through (i) the network interface of the BRAS device and (ii) the DSLAM device toward the CPE device based on the encapsulation information stored in the local memory;
wherein the external server device is a DHCP server;
wherein the CPE device is an end-user device;
wherein the DSLAM device is disposed between the end-user device and the BRAS device;
wherein the means for extracting the encapsulation information from the communications exchange between the CPE device and the external server device includes:
means for reading contents from a portion of a DHCP message which is en route from the DHCP server to the end-user device through the BRAS device and subsequently the DSLAM device to assign an Internet Protocol (IP) address to the end-user device, the contents indicating that the end-user device and the DSLAM device are constructed and arranged to exchange Transmission Control Protocol/Internet Protocol (TCP/IP) packets by (i) encapsulating portions of the TCP/IP packets within series of Asynchronous Transfer Mode (ATM) cells and (ii) exchanging the series of ATM cells, having the encapsulated portions of the TCP/IP packets therein, over a Digital Subscriber Line disposed between the end-user device and the DSLAM device; and
wherein the controller further includes:
means for receiving a set of TCP/IP packets from a TCP/IP packet source which is different than the DHCP server, the set of TCP/IP packets being en route from the TCP/IP packet source to the end-user device through the BRAS device and subsequently the DSLAM device; and
means for incrementally output each TCP/IP packet of the set of TCP/IP packets at a predetermined data rate to direct the DSLAM device, when (i) dividing the TCP/IP packets into portions, (ii) encapsulating those portions within a stream of ATM cells, and sending the stream of ATM cells to the end-user device through the Digital Subscriber Line, to provide a Quality of Service at the particular data rate to the end-user.

18. A method to control operation of a Digital Subscriber Line Access Multiplexer (DSLAM) device, the method comprising:
operating a DSLAM module within the DSLAM device;
obtaining a type of encapsulation carried out by the DSLAM module; and identifying the type of encapsulation in encapsulation information within a communications exchange between a Customer Premises Equipment (CPE) device and an external server device, the communications exchange passing through the DSLAM device and through a Broadband Remote Access Server (BRAS) device en route to an external server device;

wherein the external server device is configured to operate as a Dynamic Host Configuration Protocol (DHCP) server; and wherein identifying the type of encapsulation in encapsulation information within the communications exchange between the CPE device and the external server device includes:

inserting the encapsulation information into a DHCP message sent from the CPE device toward the DHCP server through the DSLAM device and the BRAS device;

wherein the CPE device is an end-user device;

wherein the DSLAM device is disposed between the end-user device and the BRAS device;

wherein inserting the encapsulation information into the DHCP message sent from the end-user device toward the DHCP server through the DSLAM device and the BRAS device includes inserting the encapsulation information in a form that allows:

reading, by the BRAS device, contents from a portion of a DHCP message which is en route from the DHCP server to the end-user device through the BRAS device and subsequently the DSLAM device to assign an Internet Protocol (IP) address to the end-user device, the contents indicating that the end-user device and the DSLAM device are constructed and arranged to exchange Transmission Control Protocol/Internet Protocol (TCP/IP) packets by (i) encapsulating portions of the TCP/IP packets within series of Asynchronous Transfer Mode (ATM) cells and (ii) exchanging the series of ATM cells, having the encapsulated portions of the TCP/IP packets therein, over a Digital Subscriber Line disposed between the end-user device and the DSLAM device;

receiving, at the BRAS device, a set of TCP/IP packets from a TCP/IP packet source which is different than the DHCP server, the set of TCP/IP packets being en route from the TCP/IP packet source to the end-user device through the BRAS device and subsequently the DSLAM device; and incrementally outputting, by the BRAS device, each TCP/IP packet of the set of TCP/IP packets at a predetermined data rate to direct the DSLAM device, when (i) dividing the TCP/IP packets into portions, (ii) encapsulating those portions within a stream of ATM cells, and sending the stream of ATM cells to the end-user device through the Digital Subscriber Line, to provide a Quality of Service at the particular data rate to the end-user.

19. A Digital Subscriber Line Access Multiplexer (DSLAM) device, comprising:

a network interface;

a DSLAM module; and an agent module coupled to the network interface and the DSLAM module, the agent module being configured to (i) obtain a type of encapsulation carried out by the DSLAM module, and (ii) identify the type of encapsulation in encapsulation information within a communications exchange between a Customer Premises Equipment (CPE) device and an external server device, the communications exchange passing through the DSLAM device and through a Broadband Remote Access Server (BRAS) device en route to an external server device;

wherein the external server device is configured to operate as a Dynamic Host Configuration Protocol (DHCP) server; and wherein the agent module, when identifying the type of encapsulation in the encapsulation information within the communications exchange between the CPE device and the external server device, is configured to insert the encapsulation information into a DHCP message sent from the CPE device toward the DHCP server through the DSLAM device and the BRAS device;

wherein the CPE device is an end-user device;

wherein the DSLAM device is disposed between the end-user device and the BRAS device;

wherein the agent module configured to insert the encapsulation information into the DHCP message sent from the end-user device toward the DHCP server through the DSLAM device and the BRAS device includes being configured to insert the encapsulation information in a form that allows:

reading, by the BRAS device, contents from a portion of a DHCP message which is en route from the DHCP server to the end-user device through the BRAS device and subsequently the DSLAM device to assign an Internet Protocol (IP) address to the end-user device, the contents indicating that the end-user device and the DSLAM device are constructed and arranged to exchange Transmission Control Protocol/Internet Protocol (TCP/IP) packets by (i) encapsulating portions of the TCP/IP packets within series of Asynchronous Transfer Mode (ATM) cells and (ii) exchanging the series of ATM cells, having the encapsulated portions of the TCP/IP packets therein, over a Digital Subscriber Line disposed between the end-user device and the DSLAM device;

receiving, at the BRAS device, a set of TCP/IP packets from a TCP/IP packet source which is different than the DHCP server, the set of TCP/IP packets being en route from the TCP/IP packet source to the end-user device through the BRAS device and subsequently the DSLAM device; and incrementally outputting, by the BRAS device, each TCP/IP packet of the set of TCP/IP packets at a predetermined data rate to direct the DSLAM device, when (i) dividing the TCP/IP packets into portions, (ii) encapsulating those portions within a stream of ATM cells, and sending the stream of ATM cells to the end-user device through the Digital Subscriber Line, to provide a Quality of Service at the particular data rate to the end-user.

20. A DSLAM device as in claim 19 wherein the agent module, when inserting the encapsulation information into the DHCP message sent from the CPE device toward the DHCP server through the DSLAM device and the BRAS device, is configured to:

provide contents of a DHCP Option 82 portion of the DHCP message, the contents identifying one of a variety of encapsulation protocols.

21. A DSLAM device as in claim 20 wherein the agent module, when providing the contents of the DHCP Option 82 portion of the DHCP message, is configured to:

indicate, within the contents of the DHCP Option 82 portion of the DHCP message, a particular encapsulation protocol employed by the DSLAM device on communications between the DSLAM device and the CPE device.

22. A Digital Subscriber Line Access Multiplexer (DSLAM) device, comprising:
- a network interface;
- a DSLAM module; and
- an agent module coupled to the network interface and the DSLAM module, the agent module including:
  - means for obtaining a type of encapsulation carried out by the DSLAM module, and
  - means for identifying the type of encapsulation in encapsulation information within a communications exchange between a Customer Premises Equipment (CPE) device and an external server device, the communications exchange passing through the DSLAM device and through a Broadband Remote Access Server (BRAS) device en route to an external server device;
- wherein the external server device is configured to operate as a Dynamic Host Configuration Protocol (DHCP) server; and wherein means for identifying the type of encapsulation in the encapsulation information within the communications exchange between the CPE device and the external server device of the agent module includes means for inserting the encapsulation information into a DHCP message sent from the CPE device toward the DHCP server through the DSLAM device and the BRAS device;
- wherein the CPE device is an end-user device;
- wherein the DSLAM device is disposed between the end-user device and the BRAS device;
- wherein the agent module includes means for inserting the encapsulation information into the DHCP message sent from the end-user device toward the DHCP server through the DSLAM device and the BRAS device includes being configured to insert the encapsulation information in a form that includes:
  - means for reading, by the BRAS device, contents from a portion of a DHCP message which is en route from the DHCP server to the end-user device through the BRAS device and subsequently the DSLAM device to assign an Internet Protocol (IP) address to the end-user device, the contents indicating that the end-user device and the DSLAM device are constructed and arranged to exchange Transmission Control Protocol/Internet Protocol (TCP/IP) packets by (i) encapsulating portions of the TCP/IP packets within series of Asynchronous Transfer Mode (ATM) cells and (ii) exchanging the series of ATM cells, having the encapsulated portions of the TCP/IP packets therein, over a Digital Subscriber Line disposed between the end-user device and the DSLAM device;
  - means for receiving, at the BRAS device, a set of TCP/IP packets from a TCP/IP packet source which is different than the DHCP server, the set of TCP/IP packets being en route from the TCP/IP packet source to the end-user device through the BRAS device and subsequently the DSLAM device; and
- means for incrementally outputting, by the BRAS device, each TCP/IP packet of the set of TCP/IP packets at a predetermined data rate to direct the DSLAM device, when (i) dividing the TCP/IP packets into portions, (ii) encapsulating those portions within a stream of ATM cells, and sending the stream of ATM cells to the end-user device through the Digital Subscriber Line, to provide a Quality of Service at the particular data rate to the end-user.

\* \* \* \* \*